United States Patent Office 3,297,494
Patented Jan. 10, 1967

3,297,494
CONCENTRATED MATERIAL FOR USE IN PREPARING AND REPLENISHING ZINC PHOSPHATE COATING SOLUTIONS
George C. Harrison, Roslyn, Pa., assignor to Amchem Products, Inc., Ambler, Pa., a corporation of Delaware
No Drawing. Filed Aug. 5, 1963, Ser. No. 300,078
5 Claims. (Cl. 148—6.15)

This invention relates to the art of applying phosphate conversion coatings on the surfaces of steel or zinc including, of course, galvanized steel, and the principal object of the invention is to provide a concentrated material which can be used for both initial preparation of the solution and replenishment thereof.

By way of background I wish to point out that in many modern industrial metal coating installations which employ solutions of zinc phosphate it is frequently customary to use the same solution for coating both steel and zinc surfaces including galvanized steel surfaces. In order to accomplish this objective, it is necessary that there be included in the treating solution one or more constituents which are not required for producing satisfactory coatings on one or the other of these types of metal surfaces. For example, where steel alone is being treated it is necessary to provide an oxidant which is capable of oxidizing ferrous ion to ferric ion. Generally, sodium nitrite, sodium chlorate or hydrogen peroxide are employed for this purpose. Where zinc surfaces are being treated it is not essential that such an oxidant be used, but it is quite often necessary, in order to insure obtaining uniform coatings on galvanized steel surfaces, that a complex fluoride be included in the treating solution.

This need for utilizing multiple chemicals in the coating solutions where steel as well as zinc are to be treated has complicated the formulation of materials which are suitable both for initially making up the coating solutions and for subsequently replenishing them as they are continued in operation. Actually, the art has met the problem by employing several different formulations in the makeup and replenishment of the coating solutions per se.

Some attempts have been made to provide a one-package concentrated product which could be used to prepare and to replenish coating solutions capable of treating both steel and galvanized steel surfaces. However, such attempts have been unsuccessful in view of the unstable nature of some of the commonly used oxidants, such as sodium nitrite and hydrogen peroxide, when these oxidants are combined in relatively high amounts with the phosphating chemicals required to form suitable aqueous concentrates. Additional difficulties have been encountered in attempts to formulate aqueous phosphate concentrates containing complex fluorides due to the limited solubilities of some of the commercially used complex fluoride compounds in these concentrated solutions.

Thus, in order to provide the required accelerating agent as well as the required complex fluoride, the prior art practice has necessitated the preparation, storage and use of separate solutions for making up and replenishing phosphate coating baths which are suitable for the coating of both steel and zinc surfaces.

With the foregoing in mind the principal object of the present invention resides in the provision of a stable, liquid, concentrated, zinc phosphate coating formulation which can be used in making up and/or in replenishing solutions suitable for the coating of either iron or zinc simply by adding water thereto.

The present invention is based upon the somewhat surprising discovery that a stable, concentrated aqueous formulation which is suitable for use in preparing a fresh coating solution or in replenishing an existing solution may consist essentially of the following:

|  | Mol/liter |
|---|---|
| Na | From 0.5 to 4.5. |
| $ClO_3$ | From 0.5 to 4.5. |
| $BF_4$ | From 0.3 to the limit of solubility. |
| Zn | From 1.13 to the limit of solubility. |
| $H_2PO_4$ | From 3.13 to the limit of solubility. |
| H | From 0.63 to the limit of solubility. |

The solution as so constituted must also have an ionic strength as hereinafter defined of at least 5.06 and the phrase "limit of solubility" appearing above and in the appended claims refers to the maximum concentration of a particular ionic constituent in relation to the least soluble phase in equilibrium with the solution.

In this specification, and in the claims appended hereto, reference to "ionic strength" will be understood as defining the value derived from the following equation:

$$\mu = \tfrac{1}{2}\Sigma M_i Z_i^2$$

wherein $\mu$ is the ionic strength, $M_i$ is the molarity of the $i$th specie, and $Z_i$ is the charge on the $i$th species, and the summation is to be made over each species of ion present.

In all instances, the phosphate ion specified in the formulations of this invention is considered to be $H_2PO_4$.

As noted hereinabove, both sodium and chlorate ions must be present in the concentrated formulations of this invention. The salt, sodium chlorate, is not only the economical and logical source, but it is the only suitable source, for both of these essential components. Surprisingly it has been found that the use of other monovalent cations, such, for example, as potassium or ammonium ions, in place of sodium ions, completely fails to provide stable, concentrated formulations in accordance with the teachings of this invention.

The amounts of essential sodium and chlorate ions which are required to be present in the concentrated formulations of this invention have been found to be at least 0.5 mol per liter of each constituent. Where less than this minimum amount of these two ingredients is used it will be found (after dilution of the formulation to the concentration required for the coating operation) that the quantity of the oxidant component necessary to produce the desired coatings on steel surfaces will be insufficient for the purpose. Conversely, as the sodium and chlorate ion concentration is permitted to increase it will be found that the solubility of the essential fluoborate component will decrease, so that, in the interests of maintaining sufficient solubility for the fluoborate component, the sodium and chlorate ion concentration should not be increased beyond about 4.5 mols per liter of the concentrated formulations.

With respect to the fluoborate ($BF_4$) ion concentration this must be present in an amount of at least 0.30 mol/liter in order to insure obtaining satisfactory coatings upon galvanized steel surfaces. The fluoborate ion may be added in the form of the acid or as a salt thereof, or it may be prepared in situ by adding equal molar quantities of HF and $H_3BO_3$, the important consideration being that whatever cation is used or whatever salt is selected, such cation must not in any way interfere with the stability of the concentrated solutions of this invention.

Where the essential fluoborate component is replaced by other well known and commonly used complex fluorides, such for example, as fluosilicates or fluotitanates, it has been found that it is impossible to secure a concentrated stable formulation of the required phosphate coating chemicals.

As used throughout this specification, and in the claims appended hereto, the term "stable" refers to solutions which exhibit no precipitation after three successive freeze-thraw cycles over a 48-hour period.

While applicant does not wish to be bound by theory, it is believed that the surprising solubility and stability of the concentrated aqueous solutions of this invention is attributable, at least in part, to the ionic strength effect of the solubility of sodium ions on other complex fluoride ions as compared to the effect on fluoborate ions, whereby appreciably greater amounts of both the sodium and the fluoborate components can be dissolved in the concentrated solutions of this invention.

The zinc, hydrogen and phosphate ($H_2PO_4$) ion constituents are required to be present in the concentrated aqueous formulations of this invention in minimum amounts, namely 1.13, 0.63 and 3.13 mols/liter, respectively, in order to insure that sufficient coating producing ingredients are present upon dilution of the concentrate to use strength. Preferably these ionic constituents are supplied by using zinc oxide and phosphoric acid. However, if desired, other salts of zinc may be employed such, for example, as zinc nitrate or zinc phosphate salts. The essential consideration is that, whatever salt is used, the ionic constituents thereof must not be detrimental to the formation or stability of the concentrated solutions of this invention. As for the total amounts of these three constituents, I have found no need for upper limits in their concentration because the formulations of my invention are entirely satisfactory even where these constituents may be present to the limits of their solubility in the aqueous concentrates described.

In order more fully to appreciate the surprising character of my discovery there are presented below a series of formulations which are included herewith solely for purposes of illustration. However, they are not in any way to be construed as limiting the scope of this invention except as defined in the appended claims.

*Example I*

| Ionic constituent: | Mol/liter |
|---|---|
| Zn | 1.13 |
| $H_2PO_4$ | 3.13 |
| H | 1.17 |
| Na | 0.50 |
| $ClO_3$ | 0.50 |
| $BF_4$ | 0.30 |

Water to make 1 liter.
Wherein $\mu=5.06$.

The formulation of Example I was prepared by adding phosphoric acid to an aqueous slurry of zinc oxide. After dissolution of the zinc oxide, sodium chlorate and fluoboric acid were added thereto to provide the concentrated, stable formulation of this invention which is adapted for use in preparing or in replenishing zinc phosphate coating solutions suitable for steel or zinc surfaces.

Additional examples are presented below to reflect the broad ranges of ionic constituents which can be formulated into stable, concentrated, liquid zinc phosphate solutions in accordance with the teachings of this invention.

*Example II*

| Ionic constituent: | Mol/liter |
|---|---|
| Zn | 2.26 |
| $H_2PO_4$ | 6.26 |
| H | 3.00 |
| Na | 1.0 |
| $ClO_3$ | 1.0 |
| $BF_4$ | 0.80 |
| Fe | 0.02 |
| $NO_3$ | 0.50 |

Water to make 1 liter.
Wherein $\mu=10.84$.

*Example III*

| Ionic constituent: | Mol/liter |
|---|---|
| Zn | 1.38 |
| $H_2PO_4$ | 3.40 |
| H | 1.00 |
| Na | 0.75 |
| $ClO_3$ | 0.75 |
| $BF_4$ | 0.50 |
| Ni | 0.32 |
| $NO_3$ | 0.50 |

Water to make 1 liter.
Wherein $\mu=6.85$.

*Example IV*

| Ionic constituent: | Mol/liter |
|---|---|
| Zn | 1.72 |
| $H_2PO_4$ | 4.30 |
| H | 0.92 |
| Na | 0.80 |
| $ClO_3$ | 0.80 |
| $BF_4$ | 0.40 |
| Ni | 0.25 |
| Fe | 0.02 |
| $NO_3$ | 0.20 |

Water to make 1 liter.
Wherein $\mu=7.69$.

*Example V*

| Ionic constituent: | Mol/liter |
|---|---|
| Zn | 1.72 |
| $H_2PO_4$ | 4.30 |
| H | 0.88 |
| Na | 1.36 |
| $ClO_3$ | 1.36 |
| $BF_4$ | 0.36 |
| Ni | 0.25 |
| Fe | 0.02 |
| $NO_3$ | 0.20 |

Water to make 1 liter.
Wherein $\mu=8.21$.

*Example VI*

| Ionic constituent: | Mol/liter |
|---|---|
| Zn | 1.64 |
| $H_2PO_4$ | 4.10 |
| H | 0.63 |
| Na | 0.65 |
| $ClO_3$ | 0.65 |
| $BF_4$ | 0.45 |
| Ni | 0.32 |

Water to make 1 liter.
Wherein $\mu=7.16$.

*Example VII*

| Ionic constituent: | Mol/liter |
|---|---|
| Zn | 1.64 |
| $H_2PO_4$ | 4.10 |
| H | 1.78 |
| Na | 0.65 |
| $ClO_3$ | 0.65 |
| $BF_4$ | 0.46 |
| $NO_3$ | 0.50 |

Water to make 1 liter.
Wherein $\mu=7.35$.

It will be noticed that the examples presented above reflect the addition of nickel, ferrous iron and/or nitrate ions to the concentrated solutions of this invention. As is well known the nickel constituent is a desirable accelerating agent in phosphate coating solutions utilized for treating zinc or galvanized steel surfaces. This metallic ion may be present in an amount ranging between 0.001 and 0.1 mol/liter but preferably between 0.001 and 0.08 mol/liter, and also, preferably, in the form of the nitrate salt. However, any salt of nickel may be employed so long as the anionic constituent thereof is in no way detrimental to the stability of the formulations of this invention. If amounts larger than 0.1 mol/liter of nickel are used the treated zinc surfaces may be found to contain what is commonly referred to as "white spot." Such "white spot," however is not detrimental to coating quality and is undesirable only from an aesthetic view point.

Ferrous ion is frequently desirable in the concentrated formulations of this invention for purposes of preventing precipitation of phosphate salts, particularly during dilution to use concentration. Where this component is utilized, as little as 0.01 mol/liter appears to offer increased stability to those aqueous formulations and it may be employed up to approximately 0.1 mol/liter.

Nitrate ion is frequently included in solutions used for treating zinc or galvanized steel surfaces since this anion functions as an accelerating agent to hasten coating formation. Where its use is desired, it may be added to the concentrated formulations of this invention in amounts ranging from 0.02 mol/liter to 0.5 mol/liter.

With respect to actual dilution of these concentrates for purposes of preparing zinc phosphate coating solutions, the initial concentration of the particular formulation being used as well as the desired strength of the bath will naturally dictate what ratio of water to concentrate should be used. Generally, however, the concentrations of this invention may be diluted so as to yield from about 0.2 gram to about 50 grams, or preferably from about 0.4 gram to about 30 grams/liter of zinc phosphate, calculated as $Zn(H_2PO_4)_2$, and as so diluted, these solutions will be found to provide completely acceptable results in accordance with the teachings of this invention.

The embodiments of the invention in which an exclusive property or privilege is claimed are defined as follows:

1. A concentrated, aqueous, zinc phosphate composition suitable for dilution with water, consisting essentially of:

| | Mols per liter |
|---|---|
| Na | From 0.5 to 4.5. |
| $ClO_3$ | From 0.5 to 4.5. |
| Zn | From 1.13 to saturation. |
| H | From 0.63 to saturation. |
| $H_2PO_4$ | From 3.13 to saturation. |
| $BF_4$ | From 0.3 to saturation. | said composition being further characterized by having an ionic strength of at least 5.06.

2. The composition of claim 1 which also contains at least 0.001 mol/liter of nickel ion.

3. The composition of claim 1 which also contains at least 0.01 mol/liter of ferrous ion.

4. The composition of claim 1 which also contains from 0.02 mol/liter to 0.5 mol/liter of nitrate ion.

5. The composition of claim 2 which also contains from 0.02 mol/liter to 0.5 mol/liter of nitrate ion.

References Cited by the Examiner
UNITED STATES PATENTS

| | | | |
|---|---|---|---|
| 2,312,855 | 3/1943 | Thompson | 148—6.15 |
| 2,477,841 | 8/1949 | Ward | 148—6.15 |
| 2,500,673 | 3/1950 | Gibson | 148—6.15 |
| 2,591,479 | 4/1952 | Ward | 148—6.15 X |
| 2,809,907 | 10/1957 | Cramer | 148—6.15 |
| 2,813,812 | 11/1957 | Somers et al. | 148—6.15 |
| 3,240,633 | 3/1966 | Gowman | 148—6.15 |

ALFRED L. LEAVITT, *Primary Examiner.*

R. S. KENDALL, *Assistant Examiner.*